US012595638B2

(12) United States Patent
Shiroku

(10) Patent No.: US 12,595,638 B2
(45) Date of Patent: Apr. 7, 2026

(54) MACHINE THAT MOVES LEVER, AND COMPUTER CONNECTED TO MACHINE

(71) Applicant: ARAV Inc., Tokyo (JP)

(72) Inventor: Reyestatsuru Shiroku, Tokyo (JP)

(73) Assignee: ARAV Inc., Tokyo (JP)

( * ) Notice: Subject to any disclaimer, the term of this patent is extended or adjusted under 35 U.S.C. 154(b) by 240 days.

(21) Appl. No.: 18/696,140

(22) PCT Filed: Nov. 22, 2022

(86) PCT No.: PCT/JP2022/043086
§ 371 (c)(1),
(2) Date: Sep. 27, 2024

(87) PCT Pub. No.: WO2023/095765
PCT Pub. Date: Jun. 1, 2023

(65) Prior Publication Data

US 2025/0333929 A1 Oct. 30, 2025

(30) Foreign Application Priority Data

Nov. 24, 2021 (JP) ................................ 2021-189960

(51) Int. Cl.
*E02F 9/20* (2006.01)
*G05G 9/047* (2006.01)

(52) U.S. Cl.
CPC ........... *E02F 9/2004* (2013.01); *G05G 9/047* (2013.01); *G05G 2009/04707* (2013.01)

(58) Field of Classification Search
CPC .......... E02F 9/2004; E02F 9/20; G05G 9/047; G05G 2009/04707; G05G 2009/04718; G05G 7/02
USPC .............................................................. 701/2
See application file for complete search history.

(56) References Cited

U.S. PATENT DOCUMENTS

2016/0356019 A1 12/2016 Han et al.
2018/0142779 A1 5/2018 Turpitz et al.
2023/0167625 A1 6/2023 Hama et al.

FOREIGN PATENT DOCUMENTS

JP 2011-243101 A 12/2011
WO 2019/039546 A1 2/2019
WO 2021/084886 A1 5/2021

OTHER PUBLICATIONS

International Search Report for corresponding Application No. PCT/JP2022/043086, mailed Feb. 7, 2023.

*Primary Examiner* — Maceeh Anwari
(74) *Attorney, Agent, or Firm* — Renner, Otto, Boisselle & Sklar, LLP

(57) ABSTRACT

A machine according to an aspect of this disclosure moves a lever movable in a first direction and a second direction perpendicular to the first direction. This machine includes a base member, a first actuator, a second actuator, a connector, a first frame, a second frame, and a third frame. The first actuator has a first output shaft that moves along the first direction. The second actuator has a second output shaft that moves along the second direction. The first frame has a first proximal end where a first joint is disposed and a first distal end where the second joint is disposed. The second frame has a second proximal end connected to the first distal end via the second joint, and a second distal end where a third joint is disposed. The third frame has a third proximal end and a third distal end, and the third distal end is connected to the second output shaft of the second actuator.

8 Claims, 6 Drawing Sheets

MACHINE THAT MOVES LEVER, AND COMPUTER CONNECTED TO MACHINE

TECHNICAL FIELD

The present disclosure relates to a machine that moves a lever and a computer connected to the machine.

BACKGROUND ART

Patent Document 1 discloses a remote control device attached to an operating lever of a power shovel. The operating lever can be tilted forward, backward, left and right around a fulcrum. The remote control device includes a front-rear guide that moves the operating lever in a front-rear direction by receiving a force along the front-rear direction from a first actuator, and a left-right guide that moves the operating lever in a left-right direction by receiving force along the left-right direction from a second actuator.

Patent Document 2 discloses a remote control device attached to an operating lever of a power shovel. The operating lever can be tilted forward, backward, left and right around an operating fulcrum. The remote control device includes a power transmission member that receives a force along a front-rear direction from a first actuator and moves the operating lever in the front-rear direction. This power transmission member also moves the operating lever in a left-right direction by receiving a force along the left-right direction from a second actuator.

CITATION LIST

Patent Document

Patent Document 1: JP 2011-243101 A
Patent Document 2: WO 2019/039546 A

SUMMARY OF THE INVENTION

Problem to be Solved by the Invention

This disclosure provides a machine that moves an operating lever and a computer connected to the machine, which are different from the related art.

Means for Solving Problem

A machine according to an aspect of this disclosure moves a lever movable in a first direction and a second direction perpendicular to the first direction. The machine includes a base member, a first actuator, a second actuator, a connector, a first frame, a second frame, and a third frame. The base member extends in the first direction and is connectable to a base to which the lever is fixed. The first actuator has a first output shaft that moves along the first direction. The second actuator has a second output shaft that moves along the second direction. The connector can be connected to the lever. The first frame has a first proximal end in which a first joint rotatable in the first direction is disposed, and a first distal end in which a second joint rotatable in the first direction is disposed opposite to the first proximal end. The second frame has a second proximal end connected to the first distal end via the second joint, and a second distal end in which a third joint rotatable in the first direction is disposed opposite to the second proximal end. The third frame has a third proximal end and a third distal end opposite the third proximal end, in which the third distal end is connected to the second output shaft of the second actuator. The lever is fixed to the base via a fourth joint. In the machine, the first joint, the second joint, the third joint, and the fourth joint, the lever, the first frame, the second frame, and the base member form a four-bar link mechanism. The first actuator is configured integrally with any one of the first joint, the second joint, and the third joint, and the first output shaft moves the joint along the first direction. The second actuator moves an entirety of the link mechanism along the second direction via the third frame. The connector transmits movement along the first direction by the first actuator and movement along the second direction by the second actuator to the lever.

A computer according to another aspect of this disclosure is connected to the machine described above. The lever is configured to be able to automatically return to a neutral position when a forcing force is removed when the lever is displaced from the neutral position due to the forcing force applied to the lever. The first actuator has backdrivability to allow movement of the first frame and the second frame along the first direction based on a forcing force applied to the lever when the first actuator is inactive. The second actuator has backdrivability to allow movement of the first actuator and the third frame along the second direction based on a forcing force applied to the lever when the second actuator is inactive. The computer detects a position of the lever when the first actuator and the second actuator are inactive, as a neutral position.

Effect of the Invention

The above-described machine and computer are different from those of the related art.

MODE(S) FOR CARRYING OUT THE INVENTION

Figure 1:
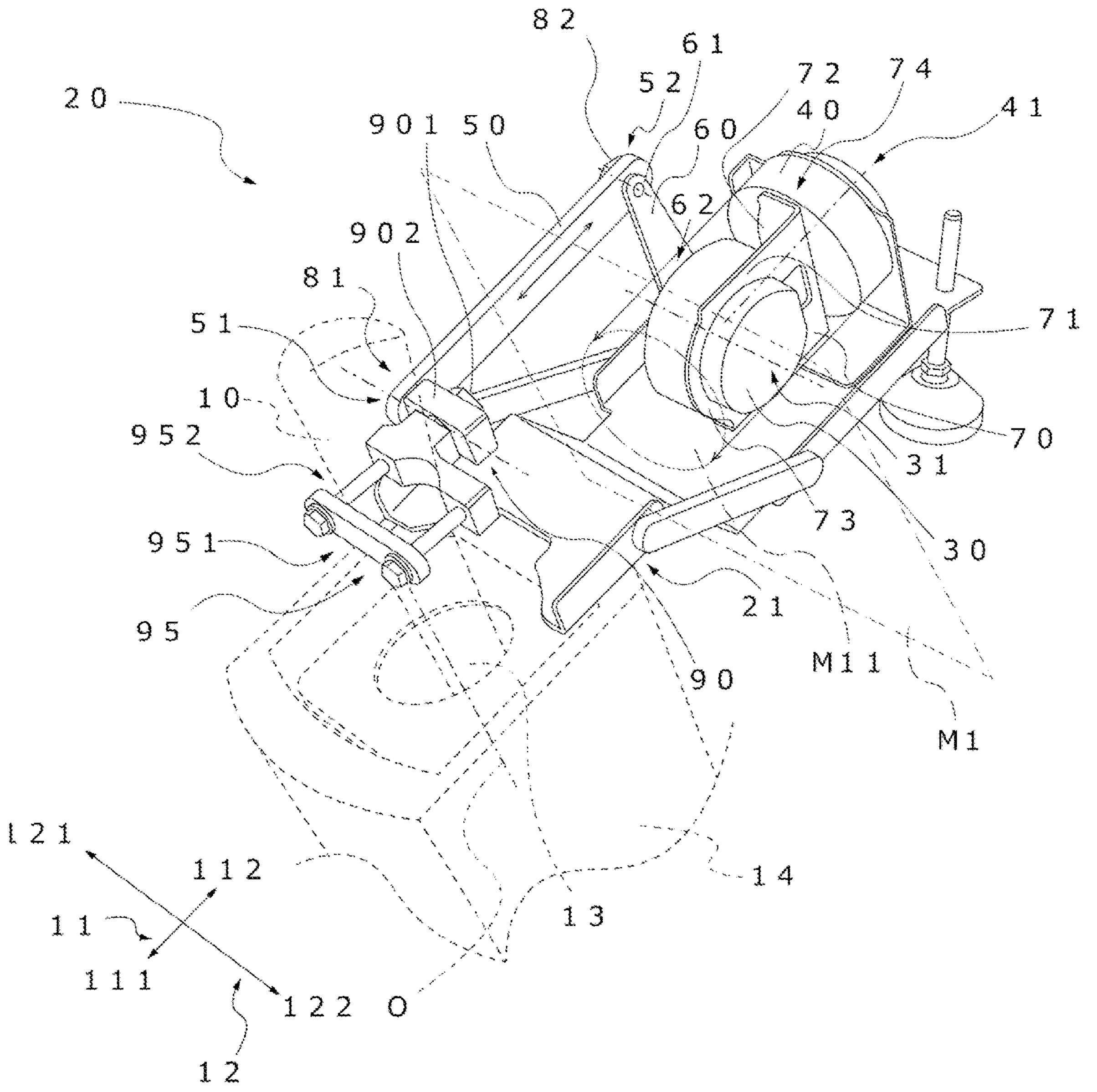
FIG. 1 is a perspective view of an apparatus according to an embodiment of this disclosure.

As illustrated in FIG. 1, a lever 10 is movable in a first direction 11 and a second direction 12 orthogonal to the first direction 11. The lever 10 is fixed to a base 14 with a ball joint 13 (an example of a fourth joint). The lever 10 is installed, for example, in a construction machine equipped with a driver's seat, such as a power shovel, a bulldozer, or a crane. The lever 10 is not limited to this, and may be used in, for example, aerospace, maritime, medical, automobile, military, entertainment, and other industries.

The lever 10 can be freely tilted around the ball joint 13 in a positive direction 111 and a negative direction 112 in the first direction 11 and in a positive direction 121 and a negative direction 122 in the second direction 12. In this embodiment, the lever 10 is a control lever installed on the right side of the driver's seat of a construction machine, and a machine 20 is attached and fixed from behind the lever 10. Therefore, in this embodiment, the first direction 11 corresponds to a front-rear direction of the construction machine on which the lever 10 is mounted. That is, the positive direction 111 of the first direction 11 corresponds to the front of the construction machine, and the negative direction 112 of the first direction 11 corresponds to the rear of the construction machine. Further, the second direction 12 orthogonal to the first direction 11 corresponds to a width direction of the construction machine on which the lever 10 is mounted. That is, the positive direction 121 of the second direction 12 corresponds to the outside of the construction machine, and the negative direction 122 of the second direction 12 corresponds to the inside of the construction machine.

The machine 20 is not limited to this, and can be attached to the lever 10 from various directions in a front, rear, left, and right directions of the construction machine. The correspondence between the first direction 11 and second direction 12 of the machine 20 and the front-rear direction and vehicle width direction of the construction machine is changed depending on an attachment posture of the machine 20 to the lever 10 and the base 14.

Further, the lever 10 is always biased toward a neutral position O by a spring (not illustrated). As a result, the lever 10 automatically returns to the neutral position O when no operation is performed by the machine 20.

The machine 20 is configured to move the lever 10. The machine 20 includes a base plate (an example of a base member) 21 connectable to the base 14. In this embodiment, the base plate 21 is fixed to, for example, the base 14 or a peripheral device of the base 14. The machine 20 may be secured in a variety of ways, such as by solid bolt fastening or chemical bonding. In this embodiment, the machine 20 is attached to the lever 10 and the base 14 from the rear 112 in the first direction 11.

In this embodiment, the base plate 21 is a plate-shaped component that extends in the first direction 11 along the shape of the base 14. In this embodiment, the base plate 21 has approximately the same size as the base 14 in the second direction 12. That is, the machine 20 is fixed without protruding from the base 14 in the second direction 12. Thereby, the machine 20 can be installed without compressing a space in the construction machine where the lever 10 is installed.

The machine 20 includes a first actuator 30 and a second actuator 40.

The first actuator 30 has a first output shaft 31 that moves along the first direction 11. The first actuator 30 is, for example, a stepping motor, a servo motor, a DC motor, or another rotating motor. The first actuator 30 rotates along the first direction 11 around the first output shaft 31 that is coaxially arranged with a rotation axis. The first actuator 30 may be a geared motor including a reduction gear or a direct drive motor without a reduction gear. In this embodiment, the first actuator 30 is a direct drive motor.

In this embodiment, the rotation of the first actuator 30 corresponds to the movement of the lever 10 along the first direction 11. That is, when the first actuator 30 rotates in the positive direction 111 of the first direction 11, the lever 10 moves in the positive direction 111 of the first direction 11 according to an amount of drive of the first actuator 30. Further, when the first actuator 30 rotates in the negative direction 112 of the first direction 11, the lever 10 moves in the negative direction 112 of the first direction 11 according to the amount of drive of the first actuator 30.

The second actuator 40 has a second output shaft 41 that moves along the second direction 12. The second actuator 40, like the first actuator 30, is a rotary motor. The second actuator 40 rotates along the second direction 12 around the second output shaft 41 that is coaxially arranged with a rotation axis. The second actuator 40 may be the same as or different from the first actuator 30. In this embodiment, the second actuator 40 is a direct drive motor. The second actuator 40 has a second output shaft 41. The second output shaft 41 is connected to a third frame 70, which will be described below.

In this embodiment, the rotation of the second actuator 40 corresponds to the movement of the lever 10 along the second direction 12. When the second actuator 40 rotates in the positive direction 121 of the second direction 12, the lever 10 moves in the positive direction 121 of the second direction 12 according to an amount of rotation of the second actuator 40. Further, when the second actuator 40 rotates in the negative direction 122 of the second direction 12, the lever 10 moves in the negative direction 122 of the second direction 12 according to the amount of rotation of the second actuator 40.

The first output shaft 31 of the first actuator 30 is arranged parallel to a plane orthogonal to the second output shaft 41 of the second actuator 40. In other words, the first output shaft 31 of the first actuator 30 and the second output shaft 41 of the second actuator 40 are arranged so that their rotational axes are substantially perpendicular to each other. That is, in the first actuator 30, the first output shaft 31 is arranged substantially parallel to the second direction 12. In this disclosure, the term "substantially parallel" refers to an angular range of 0 degrees to 45 degrees. Further, in the second actuator 40, the second output shaft 41 is arranged substantially parallel to the first direction 11. Further, the first actuator 30 is arranged within a projected area M11 obtained by projecting the second actuator 40 onto a plane M1 orthogonal to the second output shaft 41 of the second actuator 40. Thereby, the first actuator 30 and the second actuator 40 can be arranged in a small space. Therefore, the machine 20 can be downsized. As a result, the machine 20 can be installed regardless of the shape and type of the lever 10 or the arrangement of peripheral devices on the lever 10 and the base 14.

The first actuator 30 may have backdrivability. In other words, the first actuator 30 may allow movement of a member coupled to the first output shaft 31 along the first direction 11 based on a forcing force applied to the lever 10 when the first actuator 30 is inactive. The second actuator 40, like the first actuator 30, may have backdrivability. In other words, the second actuator 40 may allow movement of a member coupled to the second output shaft 41 along the second direction 12 based on a forcing force applied to the lever 10 when the second actuator 40 is inactive. Inactive refers to a situation in which the motor is not receiving motor current from a motor driver. Generally, direct drive motors have backdrivability. Thereby, the lever 10 can be manually operated by an operator on board the construction machine while the machine 20 remains attached.

The machine 20 further includes a first frame 50, a second frame 60, a third frame 70, a first joint 81, a second joint 82, and a third joint 83.

The first frame 50 is a rod-shaped member made of, for example, ferrous metal, non-ferrous metal, resin, carbon fiber, glass fiber, or a composite material thereof. The first frame 50 has a first proximal end 51 and a first distal end 52 opposite the first proximal end 51. The first proximal end 51 is connected to a connector 95 via the first joint 81, which will be described below. The first distal end 52 is connected to the second frame 60 via the second joint 82, which will be described below. That is, the first frame 50 is a link member that connects the first joint 81 and the second joint 82.

The second frame 60 is a rod-shaped member made of, for example, ferrous metal, non-ferrous metal, resin, carbon fiber, glass fiber, or a composite material thereof. The second frame 60 has a second proximal end 61 and a second distal end 62 opposite the second proximal end 61. The second proximal end 61 is connected to the first distal end 52 of first frame 50 via the second joint 82. In this embodiment, the second distal end 62 is connected to the first output shaft 31 of the first actuator 30 that is integral with the third joint 83. That is, the second frame 60 is a link member that connects the second joint 82 and the third joint 83.

The third frame 70 is made of, for example, ferrous metal, non-ferrous metal, resin, carbon fiber, glass fiber, or a composite material thereof. In this embodiment, the third frame 70 is an L-shaped component that includes a mounting portion 71 extending in the first direction 11 and a flange portion 72 extending in the second direction 12. The third frame 70 has a third proximal end 73 and a third distal end 74 opposite the third proximal end 73. The third proximal end 73 is connected to the first actuator 30. The third distal end 74 is disposed on the flange portion 72 and is connected to the second output shaft 41 of the second actuator 40. That is, the third frame 70 connects the first actuator 30 and the second output shaft 42 of the second actuator 40. Accordingly, the third frame 70 transmits the movement of the second actuator 40 along the second direction 12 to the first actuator 30 and the first frame 50 and second frame 60 that are connected to the first actuator 30.

The first joint 81 connects a posture changing unit 90, which will be described below, and the first frame 50 and is rotatable along the first direction 11. In this embodiment, the first joint 81 is located at the first proximal end 51 of the first frame 50. As a result, the first joint 81 transmits the movement along the first direction 11 inputted from the first actuator 30 from the first frame 50 to the lever 10 via the posture changing unit 90 and the connector 95 described below. Further, the movement of the lever 10 is transmitted from the lever 10 to the first frame 50 via the connector 95 and the posture changing unit 90.

The second joint 82 connects the first frame 50 and the second frame 60 and is rotatable along the first direction 11. In this embodiment, the second joint 82 is located at the first distal end 52 of the first frame 50 and the second proximal end 61 of the second frame 60. Thereby, the second joint 82 transmits the movement along the first direction 11 inputted from the first actuator 30 to the first frame 50 via the second frame 60. Further, the movement of the lever 10 is transmitted from the lever 10 to the second frame 60 via the connector 95, the posture changing unit 90, and the first frame 50.

The third joint 83 connects the second frame 60 and the first output shaft 31 of the first actuator 30, and is rotatable along the first direction 11. In this embodiment, the third joint 130 is formed integrally with the first output shaft 31 and transmits the rotation of the first actuator 30 to the second frame 60. Further, the movement of the lever 10 is transmitted from the lever 10 to actuator 30 via the connector 95, the posture changing unit 90, the first frame 50, and the second frame 60.

The machine 20 further includes the posture changing unit 90 and the connector 95.

The posture changing unit 90 connects the first joint 81 and the connector 95, which will be described below. The posture changing unit 90 includes a shaft portion 901 and a bearing portion 902. The shaft portion 91 is connected to either the connector 95 or the first joint 81. In this embodiment, the shaft portion 901 is connected to the connector 95. Further, the bearing portion 902 is connected to the first joint 81. The shaft portion 901 may be connected to the first joint 81. Further, the bearing portion 902 may be connected to the connector 95.

The shaft portion 901 is arranged so as to have a predetermined gap with respect to an inner peripheral surface of the bearing portion 902. That is, an outer diameter of the shaft portion 901 is smaller than an inner diameter of the bearing portion 902. Thereby, the bearing portion 902 is configured to be able to change its posture with respect to the shaft portion 901.

The connector 95 is configured to be connectable to the lever 10. The connector 95 includes a pair of grip portions 951 and a pair of bolts 952. The pair of grip portions 951 interpose the lever 10 along the first direction 11 from the positive direction 111 and the negative direction 112 of the first direction 11. The pair of bolts 952 are configured to be able to adjust a distance between the pair of grip portions 951. In this embodiment, the pair of bolts 952 extend in the first direction 11 and are attached so as to extend between the pair of grip portions 951. The pair of bolts 952 can adjust the distance between the pair of grip portions 951 by changing a degree of fastening of each bolt. With this configuration, the connector 95 and the lever 10 are integrally connected regardless of the shape of the lever 10. As a result, the machine 20 and the lever 10 can be linked. The structure of the connector 95 is not limited to the pair of grip portions 951 and the pair of bolts 952, but may be a mechanical fastener such as a clamp, a clip, a bolt, and a nut. Alternatively or additionally, the connector 95 may connect the lever 10 by, for example, a chemical fastener such as an adhesive.

Figure 2:
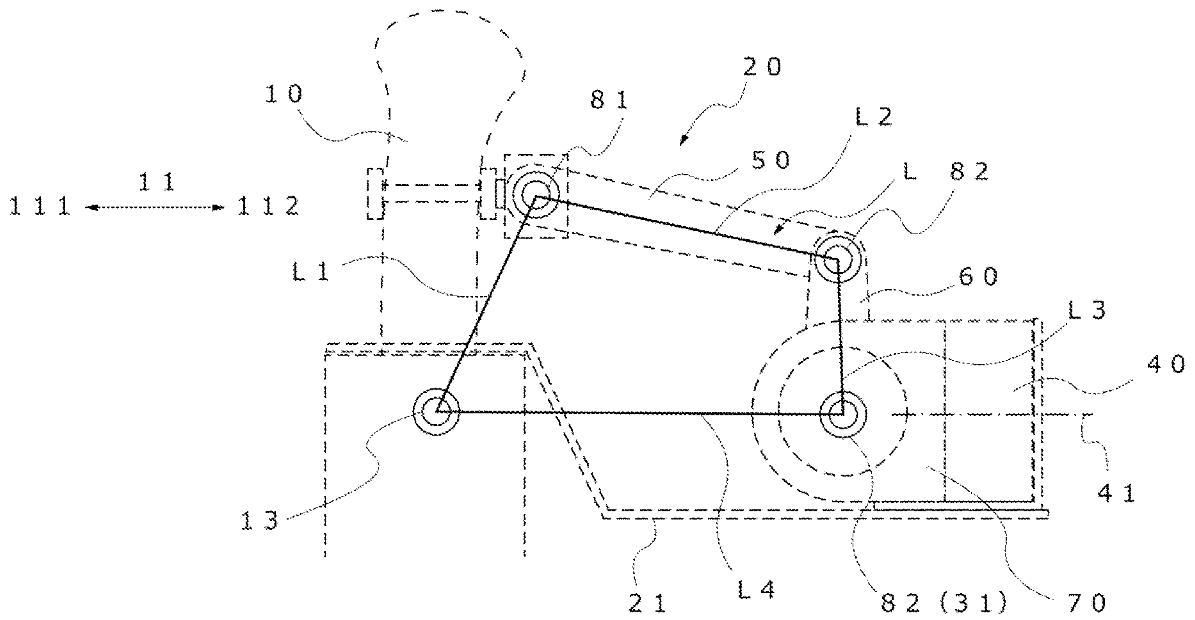
FIG. 2 is a schematic diagram illustrating an outline of the apparatus according to the embodiment of this disclosure.

FIG. 2 is a simplified schematic diagram illustrating the embodiment of the present invention from a side along the second direction 12. The machine 20 forms a link mechanism L with the ball joint 13 of the lever 10, the first joint 81, the second joint 82, and the third joint 83.

The link mechanism L has four links: a first link L1, a second link L2, a third link L3, and a fourth link L4. In this embodiment, the first link L1 is a part of the lever 10 that connects the ball joint 13 and the first joint 81. The second link L2 is the first frame 50 that connects the first joint 81 and the second joint 82. The third link L3 is the second frame 60 that connects the second joint 82 and the third joint 83. The fourth link L4 is a part of the base plate 21 that connects the third joint 83 and the ball joint 13. In the link mechanism L, among the first link L1 to the fourth link L4, the fourth link L4 is a fixed link, and the other first link L1 to third link L3 are movable links. That is, the link mechanism L is a four-bar link mechanism with one degree of freedom in which the fourth link L4 is fixed.

In this embodiment, the first actuator 30 is configured integrally with the third joint 83. Thereby, when the first actuator 30 rotates along the first direction 11, the first link L1 moves along the first direction 11 via the third link L3 and the second link L2. As a result, the lever 10, which is the first link L1, moves along the first direction 11 in accordance with the rotation of the first actuator 30. Therefore, the machine 20 can move the lever 10 along the first direction 11 by rotationally driving the first actuator 30.

In this embodiment, the first actuator 30 is configured integrally with the third joint 83, but the first actuator 30 may be configured integrally with either the first joint 81 or the second joint 82. In other words, the machine 20 may be configured such that the first actuator 30 moves, among the four joints of the link mechanism L, which is a four-bar link mechanism, any one of the first joint 81, the second joint 82, and the third joint 83, excluding the ball joint 13 of the lever 10, along the first direction 11. In either case, an amount of movement of the lever 10 along the first direction 11 based on an amount of drive of the first actuator 30 can be determined geometrically.

The second actuator 40 is connected to the first actuator 30 via third frame 70. That is, the second actuator 40 moves the entirety of the link mechanism L along the second direction 12 via the third frame 70 by being rotationally driven in the second direction 12 (not illustrated). Thereby, the machine 20 can move the lever 10 along the second direction 12 by rotationally driving the second actuator 40. An amount of movement of the lever 10 along the second direction 12 based on the amount of drive of the second actuator 40 can be determined geometrically.

The machine 20 can freely move the lever 10 by moving the first link L1 of the link mechanism L along the first direction 11 by the first actuator 30 and moving the entirety of the link mechanism L along the second direction 12 by the second actuator 40. In this embodiment, the machine 20 is attached to the lever 10 so that the first direction 11 corresponds to the front-rear direction of the construction machine on which the lever 10 is installed. Further, the machine 20 is attached to the lever 10 so that the second direction 12 corresponds to the width direction of the construction machine. Therefore, when it is desired to move the lever 10 along the front-rear direction of the construction machine, the machine 20 only needs to rotate the first actuator 30 based on a desired amount of movement of the lever 10. Further, when it is desired to move the lever 10 along the width direction of the construction machine, the machine 20 may rotate the second actuator 40 based on a desired amount of movement of the lever 10. As a result, the machine 20 can move the lever 10 to any position by a combination of rotations of the first actuator 30 and the second actuator 40.

Figure 3:
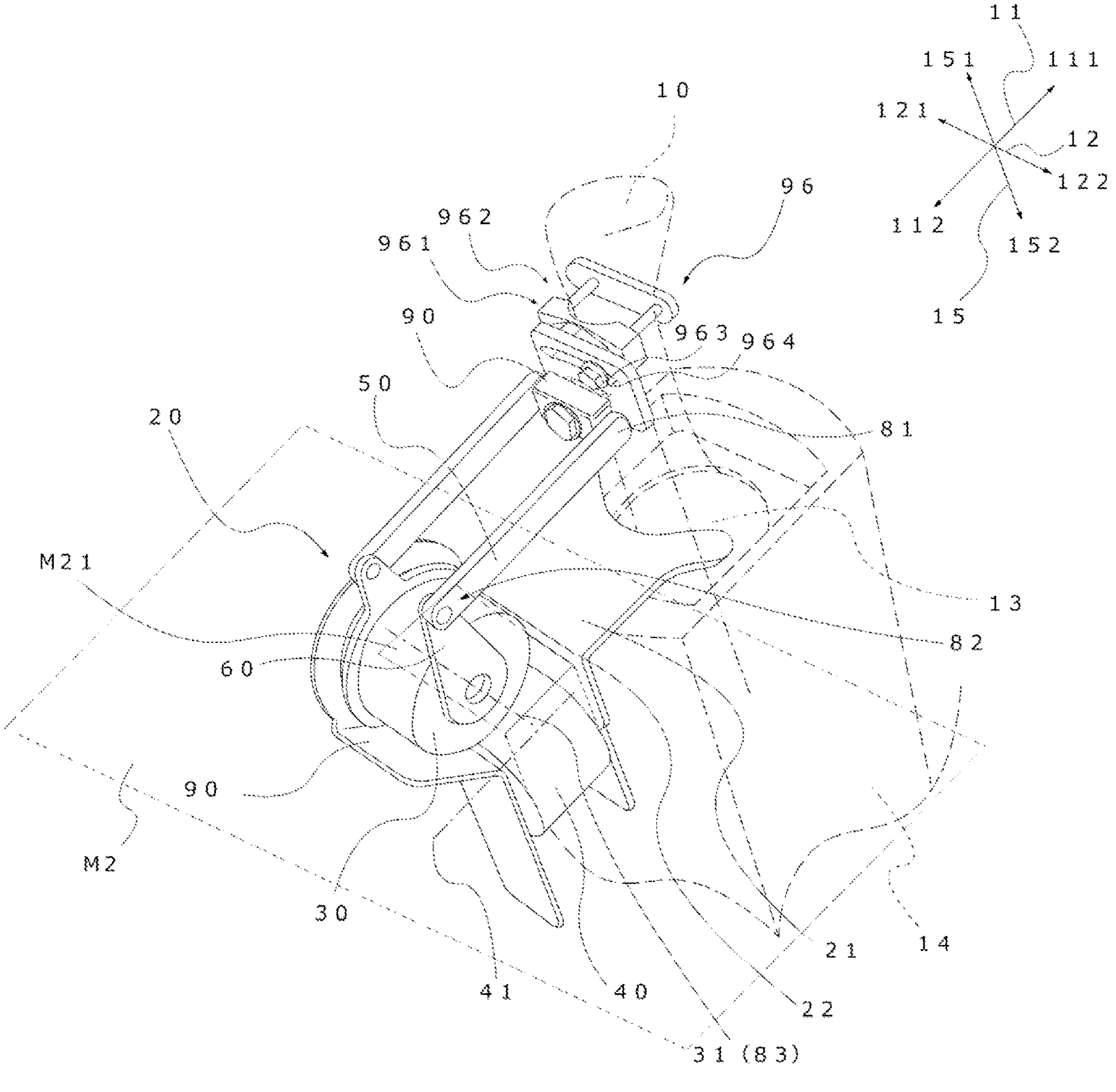
FIG. 3 is a perspective view of an apparatus according to another embodiment of this disclosure.
Figure 4:
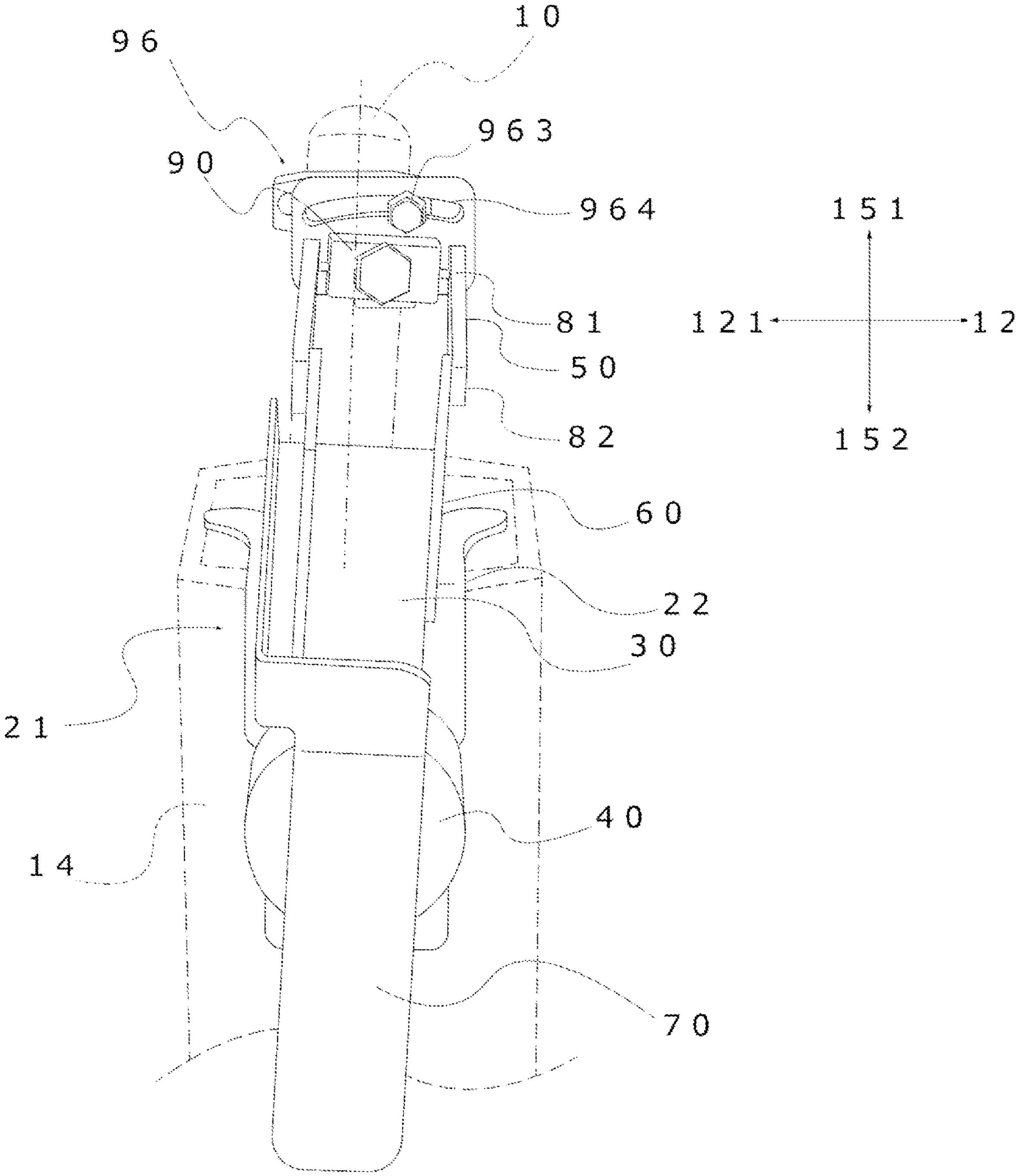
FIG. 4 is a front view of the apparatus according to the other embodiment of this disclosure.

FIG. 3 is a perspective view schematically illustrating another embodiment of the invention. FIG. 4 is a front view of the other embodiment in FIG. 3 viewed along the first direction 11 from a side where the first actuator 30 and the second actuator 40 are arranged.

In this embodiment, the machine 20 is attached and fixed from the rear of the lever 10. Therefore, in this embodiment, the first direction 11 corresponds to the front-rear direction of the construction machine on which the lever 10 is mounted. That is, the positive direction 111 of the first direction 11 corresponds to the front of the construction machine, and the negative direction 112 of the first direction 11 corresponds to the rear of the construction machine. Further, the second direction 12 orthogonal to the first direction 11 corresponds to the width direction of the construction machine on which the lever 10 is mounted. That is, the positive direction 121 of the second direction 12 corresponds to the inside of the construction machine, and the negative direction 122 of the second direction 12 corresponds to the outside of the construction machine. Further, a third direction 15 orthogonal to the first direction 11 and the second direction 12 corresponds to an up-down direction of the construction machine on which the lever 10 is mounted. That is, a positive direction 151 of the third direction 15 corresponds to an upper side of the construction machine, and a negative direction 152 of the third direction 15 corresponds to a lower side of the construction machine.

As illustrated in FIGS. 3 and 4, the base plate 21 may have an L-shape that extends in the first direction 11 and partially extends in the third direction 15 orthogonal to the first direction 11 and the second direction 12. This allows the machine 20 to be attached along a side surface of the base 14. Therefore, the machine 20 can be downsized. As a result, the machine 20 can be installed regardless of the shape or type of the lever 10. The base plate 21 can be changed into various shapes depending on the shapes of the lever 10 and the base 14, the arrangement of peripheral devices, and the attachment space.

In this embodiment, the base plate 21 is attached to the base 14 along the first direction 11, but the attachment direction can be changed in various ways. For example, the base plate 21 may be attached to the base 14 along the second direction 12. In this case, the first direction 11 corresponds to the width direction of the construction machine on which the lever 10 is installed, and the second direction 12 similarly corresponds to the front-rear direction of the construction machine.

The first actuator 30 may have the first output shaft 31 disposed within a projected area M21 obtained by projecting the second actuator 40 onto a plane M2 extending between the first direction 11 and the second direction 12. In this embodiment, the first actuator 30 is arranged near an L-shaped bent portion 22 of the base plate 21. Thereby, the machine 20 can be downsized without hindering an operation of the first actuator 30.

A connector 96 of this embodiment may include a pair of grip portions 961, a pair of bolts 962, a long hole 963, and a position adjustment bolt 964. The long hole 963 is formed so that its longitudinal direction is parallel to the second direction 12. The position adjustment bolt 964 has an axis arranged along the first direction 11, and is inserted into the long hole 963 and fixed at any position. Thereby, the connector 96 can be connected to the lever 10 in any position and posture. Thereby, the machine 20 can be reliably attached regardless of the shape or posture of the lever 10.

Figure 5:
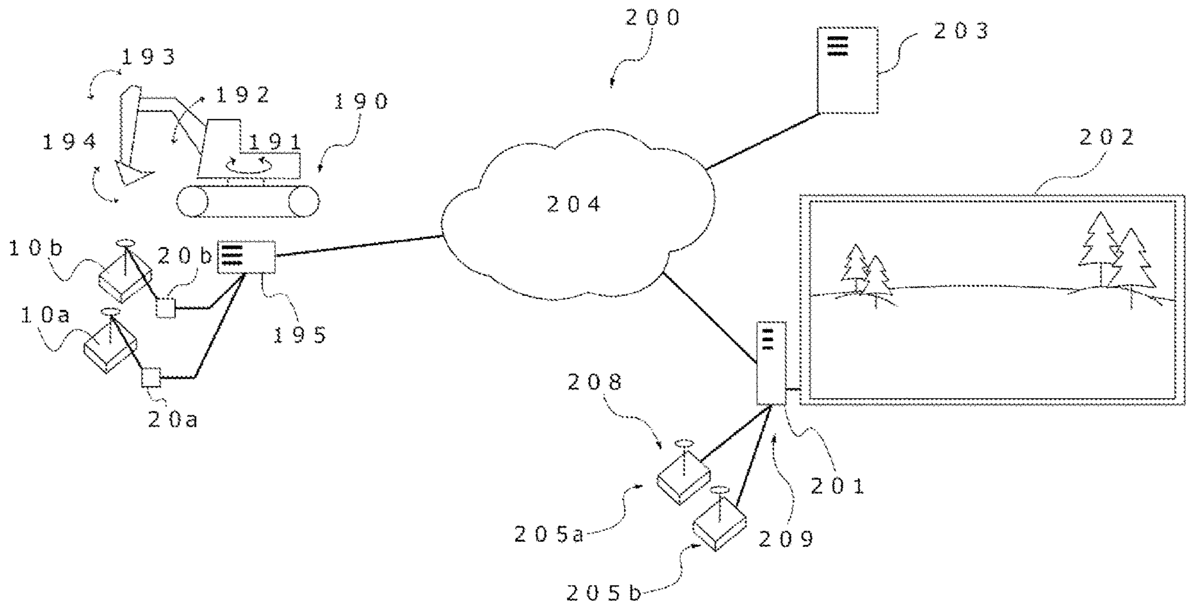
FIG. 5 is a block diagram illustrating a system according to an embodiment of this disclosure.

FIG. 5 illustrates a system 200 to which the above-described machine is applied. The system 200 allows remote control of the power shovel 190 by an operator.

The system 200 includes the power shovel 190. The power shovel 190 includes, for example, four movable axes: a pivot shaft 191 between a crawler and the driver's seat, an articulation shaft 192 between the driver's seat and a boom, an articulation shaft 193 between the boom and an arm, and an articulation shaft 194 between the arm and a bucket. The pivot shaft 191 allows the driver's seat to turn left and right. The articulation shaft 192 allows the boom to be raised and lowered. The articulation shaft 193 allows the arm to dump and dig. The articulation shaft 194 allows the bucket to dump and dig.

The power shovel 190 includes a left joystick **10*a* and a right joystick 10*b*. Both the left joystick 10*a* and the right joystick 10*b* are similar to the lever 10 illustrated in FIGS. 1, 2, 3, and 4. The left joystick 10*a* provides two-axis operation of the power shovel 190 in the front-rear direction and the vehicle width direction. The right joystick 10*b*, like the left joystick 10*a*, provides two-axis operation of the power shovel 190 in the front-rear direction and the vehicle width direction. The four movable axes of the power shovel 190** are assigned to a total of four axes of the left joystick

10*a* and the right joystick 10*b*. This allocation pattern depends on the construction machine company or construction machine model.

In one example, the movement of the left joystick 10*a* in the front-rear direction is responsible for turning the driver's seat to the left or right, and the movement of the left joystick 10*a* in the vehicle width direction is responsible for dumping and digging of the arm. Also, the movement of the right joystick 10*b* in the front-rear direction is responsible for moving the boom up and down, and the movement of the right joystick 10*b* in the vehicle width direction is responsible for dumping and digging of the bucket.

In another example, the movement of the left joystick 10*a* in the front-rear direction is responsible for dumping and digging of the bucket, and the movement of the left joystick 10*a* in the vehicle width direction is responsible for moving the boom up and down. Also, the movement of the right joystick 10*b* in the front-rear direction is responsible for turning the driver's seat to the left and right, and the movement of the right joystick 10*b* in the vehicle width direction is responsible for dumping and digging of the arm.

The system 200 further includes a machine 20*a* connected to the left joystick 10*a* and a machine 20*b* connected to the right joystick 10*b*. The machine 20*a* and machine 20*b* are similar to the machine 20 illustrated in FIG. 1 or 3.

In this embodiment, the machine 20*a* is attached to the lever 10 and the base 14 along the front-rear direction of the power shovel 190, as illustrated in FIG. 1. Therefore, the first direction 11 of the machine 20*a* corresponds to the front-rear direction of the power shovel 190, and the second direction 12 of the machine 20*a* corresponds to the width direction of the power shovel 190. The same applies to the machine 20*b*. That is, when moving the levers 10*a* and 10*b* of the power shovel 190 in the front-rear direction, the machines 20*a* and 20*b* respectively move the levers 10*a* and 10*b* along the first direction 11. Further, when moving the levers 10*a* and 10*b* of the power shovel 190 in the width direction, the machines 20*a* and 20*b* respectively move the levers 10*a* and 10*b* along the second direction 12.

The system 200 further includes a remote interface 208. The remote interface 208 accepts manual operations by an operator. The remote interface 208 may be, for example, left joystick 205*a* and right joystick 205*b*. The left joystick 205*a* is capable of detecting operator's operations in a fifth direction corresponding to the first direction 11 and in a sixth direction corresponding to the second direction 12. The right joystick 205*b* may be similar to the left joystick 205*a*.

The amount of operation by the operator is detected as the amount of movement of the remote interface 208. Instead of the amount of movement, the amount of operation may be an angular velocity, position coordinate, pressure, or other physical amount that reflects the amount of operation of the remote interface 208 by the operator.

The system 200 may further include a display 202. The display 202 may provide the operator with a driver's seat view that displays the view from the driver's seat of the power shovel 190 in real time. The operator may operate the remote interface 208 while viewing the driver's seat view.

The system 200 may include a computer 195, a computer 201, and a computer 203 connected to Internet 204. The computer 195 is located within the power shovel 190. The computer 201 is placed in a remote control room. The computer 203 is a cloud server.

A computer 209 receives the amount of operation from the remote interface 208. The computer 209 may be any one of the computers 195, 201, and 203 illustrated in FIG. 5, or a collection of at least two thereof.

Figure 6:
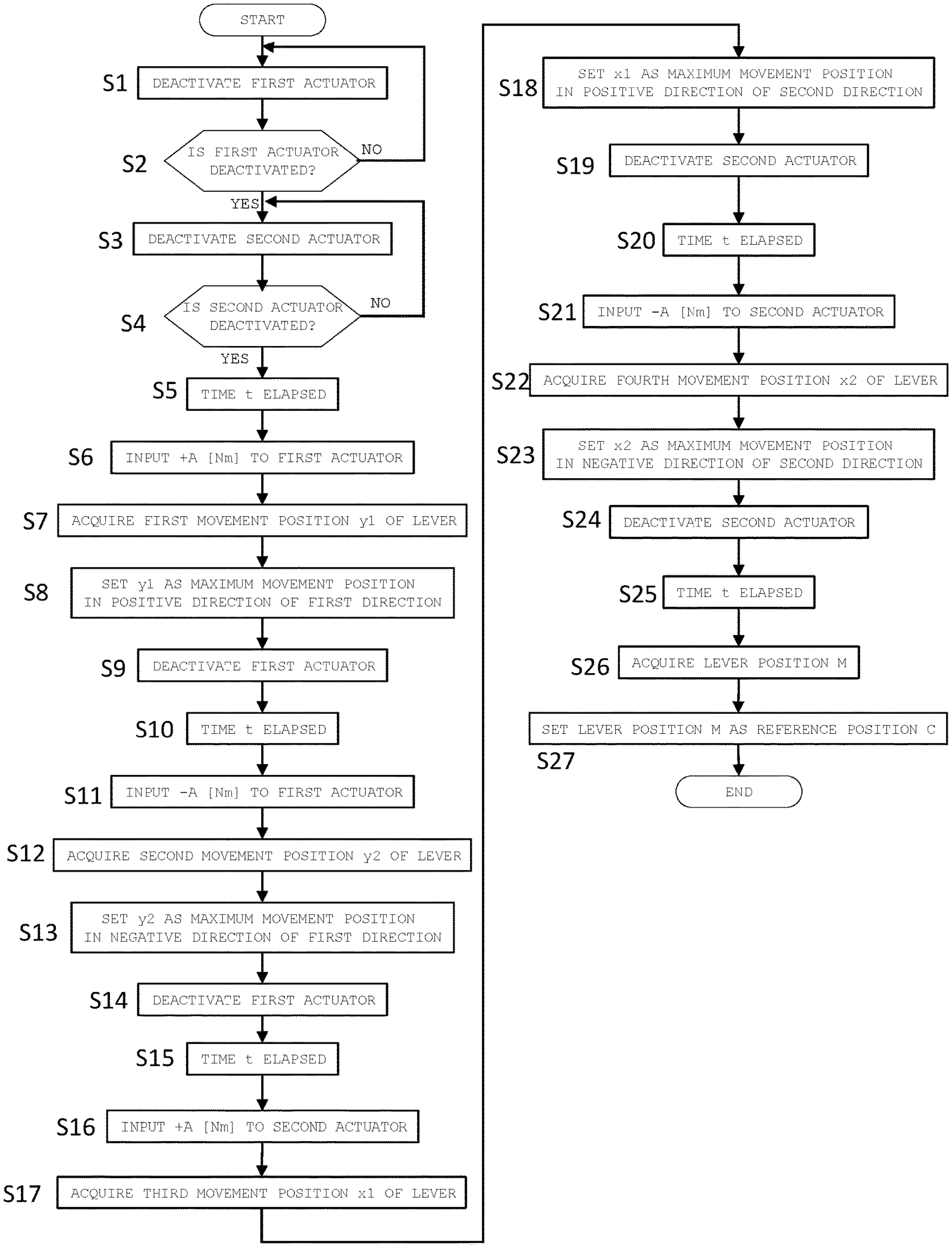
FIG. 6 is a flowchart illustrating flow of control according to the embodiment of this disclosure.

FIG. 6 illustrates flow of calibration for the machine 20 to accurately operate the lever 10 based on the amount of operation of the remote interface 208.

As illustrated in FIG. 6, when calibration is started, the computer 195 deactivates the first actuator 30 (step S1). The computer 195 determines whether the first actuator 30 is deactivated (step S2). When it is determined that the first actuator 30 is deactivated (step S2: Yes), the control proceeds to step S3. On the other hand, when it is determined that the first actuator 30 is not deactivated (step S2: No), the control is returned to before step S1, and the first actuator 30 is deactivated.

The computer 195 deactivates the second actuator 40 (step S3). The computer 195 determines whether the second actuator 40 is deactivated (step S4). When it is determined that the second actuator 40 is deactivated (step S4: Yes), the control proceeds to step S5. On the other hand, when it is determined that the second actuator 40 is not deactivated (step S4: No), the control is returned to before step S3, and the second actuator 40 is deactivated.

Proceeding to step S5, the computer 195 waits until a predetermined waiting time t has elapsed (step S5). This waiting time t may be any time that allows the lever 10 to automatically return to the neutral position O. Thereby, calibration can be executed with the lever 10 in the neutral position O. As a result, the operator can have the machine 20 accurately operate the lever 10 via the remote interface 208.

The computer 195 executes control so that the first actuator 30 outputs a predetermined torque +A [Nm] (an example of first power) (step S6). Thereby, the machine 20 moves the lever 10 along the positive direction (an example of a first side) 111, which is one side of the first direction 11. In this case, the predetermined torque +A [Nm] may be set to any value.

The computer 195 acquires a first movement position y1, which is a movement position of the lever 10 along the first direction 11 (step S7). Further, the first movement position y1 acquired in step S7 is set as a maximum movement position in the positive direction 111 of the first direction 11 (step S8). That is, the computer 195 stores a first drive amount, which is a drive amount of the first actuator 30 in step S8, and the first movement position y1 acquired in step S10. Thereby, it is possible to obtain a correlation between the output of the first actuator 30 and the amount of movement of the lever 10 when the lever 10 is moved along the positive direction 111 of the first direction 11. Further, based on this correlation, the computer 195 can generate a map of the relationship between the amount of movement of the lever 10 along the positive direction 111 of the first direction 11 and the output of the first actuator 30 for obtaining the amount of movement of this lever 10. As a result, the computer 195 can determine the output of the first actuator 30 based on a target movement amount along the positive direction 111 of the first direction 11 of the lever 10.

The computer 195 deactivates the first actuator 30 (step S9). As a result, the lever 10 automatically returns to the neutral position O. The computer 195 waits until a predetermined waiting time t has elapsed (step S10). The waiting time t may be the same as the waiting time t in step S5, or may be set to any different time period.

The computer 195 executes control so that the first actuator 30 outputs a predetermined torque −A [Nm] (an example of second power) (step S11). Thereby, the machine 20 moves the lever 10 along the negative direction (an example of a second side) 112, which is the other side of the first direction 11. In this case, the predetermined torque −A

[Nm] may be set to have the same absolute value of the first torque output in step S6, or may be set to any different value.

The computer 195 acquires a second movement position y2, which is a movement position of the lever 10 along the first direction 11 (step S12). Further, the second movement position y2 acquired in step S12 is set as a maximum movement position in the negative direction 112 of the first direction 11 (step S13). That is, the computer 195 stores a second drive amount, which is a drive amount of the first actuator 30 in step S11, and the second movement position y2 acquired in step S12. Thereby, it is possible to obtain a correlation between the output of the first actuator 30 and the amount of movement of the lever 10 when the lever 10 is moved along the negative direction 112 of the first direction 11. Further, based on this correlation, the computer 195 can generate a map of the relationship between the amount of movement of the lever 10 along the negative direction 112 of the first direction 11 and the output of the first actuator 30 for obtaining the amount of movement of this lever 10. As a result, the computer 195 can determine the output of the first actuator 30 based on a target movement amount along the negative direction 112 of the first direction 11 of the lever 10.

The computer 195 deactivates the first actuator 30 (step S14). As a result, the lever 10 automatically returns to the neutral position O. The computer 195 waits until a predetermined waiting time t has elapsed (step S15). The waiting time t may be the same as the waiting time t in step S5, or may be set to any different time period.

The computer 195 executes control so that the second actuator 40 outputs a predetermined torque +A [Nm] (an example of third power) (step S16). Thereby, the machine 20 moves the lever 10 along the positive direction (an example of a third side) 121, which is one side of the second direction 12. In this case, the predetermined torque +A [Nm] may be set to have the same absolute value of the first torque or the second torque, or may be set to any different value.

The computer 195 acquires a third movement position x1, which is a movement position of the lever 10 along the second direction 12 (step S17). Further, the third movement position x1 acquired in step S17 is set as a maximum movement position in the positive direction 121 of the second direction 12 (step S18). That is, the computer 195 stores a third drive amount, which is a drive amount of the second actuator 40 in step S16, and the third movement position x1 acquired in step S17. Thereby, it is possible to obtain a correlation between the output of the second actuator 40 and the amount of movement of the lever 10 when the lever 10 is moved along the positive direction 121 of the second direction 12. Further, based on this correlation, the computer 195 can generate a map of the relationship between the amount of movement of the lever 10 along the positive direction 121 of the second direction 12 and the output of the second actuator 40 for obtaining the amount of movement of this lever 10. As a result, the computer 195 can determine the output of the second actuator 40 based on a target movement amount along the positive direction 121 of the second direction 12 of the lever 10.

The computer 195 deactivates the second actuator 40 (step S19). As a result, the lever 10 automatically returns to the neutral position O. The computer 195 waits until a predetermined waiting time t has elapsed (step S20). The waiting time t may be the same as the waiting time t in step S5, or may be set to any different time period.

The computer 195 executes control so that the second actuator 40 outputs a predetermined torque −A [Nm] (an example of fourth power) (step S21). Thereby, the machine 20 moves the lever 10 along the negative direction (an example of a fourth side) 122, which is the other side of the second direction 12. In this case, the predetermined torque −A [Nm] may be set to have the same absolute value of the first torque, the second torque, or the third torque, or may be set to any different value.

The computer 195 acquires a fourth movement position x2, which is a movement position of the lever 10 along the second direction 12 (step S22). Further, the fourth movement position x2 acquired in step S22 is set as a maximum movement position in the negative direction 122 of the second direction 12 (step S23). That is, the computer 195 stores a fourth drive amount, which is a drive amount of the second actuator 40 in step S21, and the fourth movement position x2 acquired in step S22. Thereby, it is possible to obtain a correlation between the output of the second actuator 40 and the amount of movement of the lever 10 when the lever 10 is moved along the negative direction 122 of the second direction 12. Further, based on this correlation, the computer 195 can generate a map of the relationship between the amount of movement of the lever 10 along the negative direction 122 of the second direction 12 and the output of the second actuator 40 for obtaining the amount of movement of this lever 10. As a result, the computer 195 can determine the output of the second actuator 40 based on a target movement amount along the negative direction 122 of the second direction 12 of the lever 10.

The computer 195 deactivates the second actuator 40 (step S24). As a result, the lever 10 automatically returns to neutral position O. The computer 195 waits until a predetermined waiting time t has elapsed (step S25). The waiting time t may be the same as the waiting time t in step S5, or may be set to any different time period.

The computer 195 acquires a position M of the lever 10 (step S26). Further, the position M is set as a reference position C (step S27). It is preferable that the computer 195 sets the reference position C while the first actuator 30 and the second actuator 40 are inactive. The computer 195 may acquire the position M of the lever 10 and set it as the reference position C, for example, after steps S5, S10, S15, and S20.

In this embodiment, although the calibration is performed in the order of the positive direction 111 of the first direction 11, the negative direction 112, the positive direction 121 of the second direction 12, and the negative direction 122, these orders can be changed arbitrarily. Once a map showing the relationship between the target movement amount of the lever 10 and the outputs of the first actuator 30 and the second actuator 40 is generated for each of the above-mentioned directions, the calibration is completed and the control is ended.

By performing such control, the system 200 can obtain a correlation between output torques of the first actuator 30 and second actuator 40 of the machine 20 and the amount of movement of the lever 10. The system 200 can calculate a required amount of movement of the lever 10 from the amount of operation of the remote interface 208 by the operator, and determine outputs required of the first actuator 30 and the second actuator 40.

EXPLANATIONS OF LETTERS OR NUMERALS

10 LEVER
11 FIRST DIRECTION
12 SECOND DIRECTION
13 BALL JOINT
14 BASE

20 MACHINE
30 FIRST ACTUATOR
31 FIRST OUTPUT SHAFT
40 SECOND ACTUATOR
41 SECOND OUTPUT SHAFT
50 FIRST FRAME
51 FIRST PROXIMAL END
52 FIRST DISTAL END
60 SECOND FRAME
61 SECOND PROXIMAL END
62 SECOND DISTAL END
70 THIRD FRAME
71 THIRD PROXIMAL END
72 THIRD DISTAL END
81 FIRST JOINT
82 SECOND JOINT
83 THIRD JOINT
90 POSTURE CHANGING UNIT
95 CONNECTOR
200 SYSTEM
195, 201, 203, 209 COMPUTER
O NEUTRAL POSITION
L LINK MECHANISM

The invention claimed is:

1. A machine that moves a lever movable in a first direction and a second direction perpendicular to the first direction, the machine comprising:

a base member extending in the first direction and connectable to a base to which the lever is fixed;

a first actuator having a first output shaft that moves along the first direction;

a second actuator having a second output shaft that moves along the second direction;

a connector configured to be connected to the lever;

a first frame having a first proximal end and a first distal end opposite to the first proximal end, the first proximal end in which a first joint rotatable in the first direction is disposed, the first distal end in which a second joint rotatable in the first direction is disposed;

a second frame having a second proximal end and a second distal end opposite to the second proximal end, the second proximal end being connected to the first distal end via the second joint, the second distal end in which a third joint rotatable in the first direction is disposed; and a third frame having a third proximal end and a third distal end opposite the third proximal end, the third distal end being connected to the second output shaft of the second actuator, wherein the lever is fixed to the base via a fourth joint, the first joint, the second joint, the third joint, and the fourth joint, the lever, the first frame, the second frame, and the base member form a four-bar link mechanism, the first actuator is configured integrally with one of the first joint, the second joint, and the third joint, and the first output shaft moves the one of the first joint, the second joint and the third joint along the first direction, the second actuator moves an entirety of the link mechanism along the second direction via the third frame, and the connector transmits movement along the first direction by the first actuator and movement along the second direction by the second actuator to the lever.

2. The machine according to claim 1, wherein the first output shaft of the first actuator is arranged parallel to a plane orthogonal to the second output shaft of the second actuator.

3. The machine according to claim 1, wherein the third proximal end of the third frame is connected to the first actuator, and the second actuator moves the first actuator and the third frame along the second direction.

4. The machine according to claim 1, wherein the first actuator is disposed within a projected area obtained by projecting the second actuator onto a plane orthogonal to the second output shaft of the second actuator.

5. The machine according to claim 1, wherein the first output shaft of the first actuator is disposed within a projected area obtained by projecting the second actuator onto a plane extending between the first direction and the second direction.

6. The machine according to claim 1, further comprising:

a posture changing unit connected to the first proximal end, the posture changing unit having a shaft portion and a bearing portion configured to change a posture with respect to the shaft portion, the shaft portion being connected to either the connector or the first proximal end, the bearing portion attached to the other of the connector or the first proximal end.

7. A computer that is connected to a machine that moves a lever movable in a first direction and a second direction perpendicular to the first direction, the machine comprising:

a base member extending in the first direction and connectable to a base to which the lever is fixed;

a first actuator having a first output shaft that moves along the first direction;

a second actuator having a second output shaft that moves along the second direction;

a connector configured to be connected to the lever;

a first frame having a first proximal end and a first distal end opposite to the first proximal end, the first proximal end in which a first joint rotatable in the first direction is disposed, the first distal end in which a second joint rotatable in the first direction is disposed;

a second frame having a second proximal end and a second distal end opposite to the second proximal end, the second proximal end being connected to the first distal end via the second joint, the second distal end in which a third joint rotatable in the first direction is disposed; and a third frame having a third proximal end and a third distal end opposite the third proximal end, the third distal end being connected to the second output shaft of the second actuator, wherein the lever is fixed to the base via a fourth joint, the first joint, the second joint, the third joint, and the fourth joint, the lever, the first frame, the second frame, and the base member form a four-bar link mechanism, the first actuator is configured integrally with one of the first joint, the second joint, and the third joint, and the first output shaft moves the one of the first joint, the second joint and the third joint along the first direction, the second actuator moves an entirety of the link mechanism along the second direction via the third frame, and the connector transmits movement along the first direction by the first actuator and movement along the second direction by the second actuator to the lever, and wherein the lever is configured to automatically return to a neutral position when a forcing force is removed when the lever is displaced from the neutral position due to the forcing force applied to the lever, the first actuator has backdrivability to allow the first frame and the second frame to move along the first direction based on a forcing force applied to the lever when the first actuator is inactive, the second actuator has backdrivability to allow the first actuator and the third frame to move along the second direction based on a forcing force applied to the lever when the second actuator is inactive, and the computer detects a position of the lever when the first actuator and the second actuator are inactive, as a neutral position.

8. The computer according to claim 7, wherein

The computer is configured to:

store a first drive amount, which is a drive amount of the first actuator, and a first movement position, which is a position of the lever, when the first actuator is driven in a first side along the first direction with a first power, store a second drive amount, which is a drive amount of the first actuator, and a second movement position, which is a position of the lever, when the first actuator is driven in a second side opposite to the first side with a second power, store a third drive amount, which is a drive amount of the second actuator, and a third movement position, which is a position of the lever, when the second actuator is driven in a third side along the second direction with a third power, store a fourth drive amount, which is a drive amount of the second actuator, and a fourth movement position, which is a position of the lever, when the second actuator is driven in a fourth side opposite to the third side with a fourth power, and determine power output by the first actuator and the second actuator, with the first movement position, the second movement position, the third movement position, and the fourth movement position being maximum movement positions of the lever.

* * * * *